United States Patent
Gehringhoff et al.

(10) Patent No.: US 6,663,169 B2
(45) Date of Patent: Dec. 16, 2003

(54) SEMI-FINISHED FLAT BLANK FOR A SIDE IMPACT BEAM, AND SIDE IMPACT BEAM FOR A MOTOR VEHICLE

(75) Inventors: Ludger Gehringhoff, Paderborn (DE); Udo Klasfauseweh, Gütersloh (DE); Hans-Jürgen Knaup, Bad Lippspringe (DE)

(73) Assignee: Benteler Automobiltechnik GmbH & Co. KG, Paderborn (DE)

( * ) Notice: Subject to any disclaimer, the term of this patent is extended or adjusted under 35 U.S.C. 154(b) by 0 days.

(21) Appl. No.: 10/157,770

(22) Filed: May 29, 2002

(65) Prior Publication Data

US 2002/0195836 A1 Dec. 26, 2002

(30) Foreign Application Priority Data

Jun. 11, 2001 (DE) .......................... 101 28 198

(51) Int. Cl.⁷ .............................................. B60R 27/00
(52) U.S. Cl. .............................. 296/187.12; 296/146.6; 296/187.03; 52/735.1
(58) Field of Search .................... 296/146.1, 146.5, 296/146.6, 187.03, 187.12, 187.05; 49/501, 502; 52/735.1, 731.7, 737.6

(56) References Cited

U.S. PATENT DOCUMENTS

| | | | |
|---|---|---|---|
| 4,796,946 A | | 1/1989 | Wilson et al. ............... 296/146 |
| 5,232,261 A | * | 8/1993 | Kuroda et al. ............ 296/146.6 |
| 5,600,931 A | * | 2/1997 | Jonsson ................... 296/146.6 |
| 5,813,718 A | * | 9/1998 | Masuda et al. .......... 296/146.6 |
| 5,887,938 A | * | 3/1999 | Topker et al. ........... 296/146.6 |
| 6,227,609 B1 | * | 5/2001 | Mellis ..................... 296/146.6 |
| 6,290,282 B1 | * | 9/2001 | Hortlund et al. ......... 296/146.6 |
| 6,360,510 B1 | * | 3/2002 | Woodrum et al. .......... 52/731.5 |
| 6,398,289 B1 | * | 6/2002 | Gehringhoff ............. 296/146.6 |
| 6,517,142 B2 | * | 2/2003 | Gehringhoff et al. .... 296/146.6 |
| 2002/0069609 A1 | * | 6/2002 | Nees et al. .............. 296/146.6 |

FOREIGN PATENT DOCUMENTS

| | | |
|---|---|---|
| DE | 296 20 079 U1 | 2/1997 |
| DE | 693 09 699 T2 | 7/1997 |
| JP | 07112612 A | 5/1995 |
| JP | 09086172 A | 3/1997 |
| JP | 10166860 A | 6/1998 |

* cited by examiner

Primary Examiner—Stephen T. Gordon
Assistant Examiner—Lori L. Coletta
(74) Attorney, Agent, or Firm—Henry M. Feiereisen

(57) ABSTRACT

A side impact beam to be integrated in a motor vehicle includes at least one elongated bar, which has a trapezoidal cross section and terminates on both ends in ramp-like end portions, wherein the elongated bar has a central web, flanks diverging outwardly from the central web, and flanges connected to the extremities of the flanks, and terminal attachment zones. For manufacturing such a side impact beam, a semifinished flat blank is cut to size of constant width from a sheet metal material band of constant thickness and includes an elongated center portion of constant width and a length which is at least half a length of the blank, wherein the center portion terminates on opposite ends in tongue-shaped end portions.

3 Claims, 2 Drawing Sheets

SEMI-FINISHED FLAT BLANK FOR A SIDE IMPACT BEAM, AND SIDE IMPACT BEAM FOR A MOTOR VEHICLE

CROSS-REFERENCES TO RELATED APPLICATIONS

This application claims the priority of German Patent Application Serial No. 101 28 198.6, filed Jun. 11, 2001, pursuant to 35 U.S.C. 119(a)–(d), the subject matter of which is incorporated herein by reference.

BACKGROUND OF THE INVENTION

The present invention relates, in general, to a side impact beam, and in particular to a side impact beam for reinforcing a door of a motor vehicle.

Side impact beams of this type have normally a trapezoidal cross section with a central web and two flanks diverging laterally outwardly from the web and having extremities which terminate in flanges that project laterally outwardly. Depending on stiffness and energy deformation requirements and available installation space, the side impact beam may also have two profiles in side-by-side disposition (double hat profile).

Various approaches have been pursued to optimize the deformation capability of the side impact beams while reducing the material consumption. Reference is made here, for example, to U.S. Pat. No. 4,796,946 or German publications DE 693 09 699 T2 and DE 296 20 079 U1. German publication 296 20 079 U1 describes a side impact beam on two supports, whereas the disclosure of German publication DE 693 09 699 T2 is limited to a partial area of a side impact beam and not concerned with the installation space in the side wall of a motor vehicle.

It would be desirable and advantageous to provide an improved side impact beam with minimum material use and optimal energy deformation ability under consideration of available installation space.

It would also be desirable and advantageous to provide an improved method of making a side impact beam to minimize the material consumption while still optimizing the energy deformation ability.

SUMMARY OF THE INVENTION

According to one aspect of the present invention, a semi-finished flat blank is used as base material for making a side impact beam to be integrated in a motor vehicle and including at least one elongated bar, which has a trapezoidal cross section and terminates on both ends in ramp-like portions, wherein the elongated bar has a central web, flanks diverging outwardly from the central web and having extremities, and flanges connected to the extremities, and terminal attachment zones, wherein the blank is cut to size of a material band of constant thickness and includes an elongated center portion of constant width and a length portion which is sized at least half a length of the blank, wherein the center portion terminates on opposite ends in tongue-shaped end portions.

Starting material for the flat blank may be a material band of sheet metal which is reeled off a coil and has a constant sheet thickness. The material band is then cut to size, e.g., by stamping, to provide the flat blank, under the particular provision that the constant width in the elongated midsection does not produce any material loss. Only the tongue-shaped end zones, which ultimately form the attachment zone of the finished side impact beam, result in a material loss which, however, can be kept to negligible level, when suitably shaping the attachment zone.

The constant width in the elongated midsection of the blank enables consideration of the available installation space as well as the particular deformation requirements during shaping process into a side impact beam. For example, when demanding different heights of the flanks of the side impact beams from the central area in direction of the terminal attachment zone, this can be easily realized by respectively shaping the blank in such a manner that excess material, at slighter height, is displaced into the flanges and/or lateral webs, which may, optionally, be provided. Also, when the central web of the side impact beam should have a varying width, excess material can be displaced especially into the flanks and/or flanges and/or, optional, side webs.

According to another aspect of the present invention, a side impact beam for integration in a sidewall of a motor vehicle, includes an elongated bar defined by a length and having a generally trapezoidal cross section, wherein the bar includes a central length portion, which extends at least over half the length of the bar and terminates, for ensuring stiffness, on opposite ends in ramp-like end portions which taper off in terminal attachment zones for local securement, wherein the bar is comprised of a central web and two flanks diverging laterally outwardly from the central web and having extremities for connection to flanges which project outwardly in transverse direction.

In accordance with the present invention, the central length portion extends thus over half the length of the side impact beam. Moreover, the central web of trapezoidal cross section of the elongated bar has, preferably, a same width over the entire length of the elongated bar, i.e. over the central length portion and over the terminal attachment zone. In this way, the flanks, diverging laterally outwardly from the central web, can be sized over the central length portion of same height or, optionally, different height, depending on the desired energy deformation capability and available installation space. Conceivable is also a varying width of the central web.

According to another feature of the present invention, the central web may terminate in the attachment zones immediately adjacent to the end faces of the attachment zones.

According to another feature of the present invention, the flanges may end in extremities for connection to lateral webs.

For manufacturing reasons, all transitions from the central web to the flanks, from the flanks to the flanges, and from the flanges to the lateral webs may be rounded. In order to attain an optimum deformation characteristics especially in the central length portion of the side impact beam in relation to the impact point of a test body during static door crushing test according to FMVSS 214, the radii from the central web to the flanks, at least in mid-section of the central length portion, are greater than 10 mm, maximal 20 mm. Tests have shown, that a length of 100 mm is adequate to sufficiently comply with requirements of the door crushing test.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
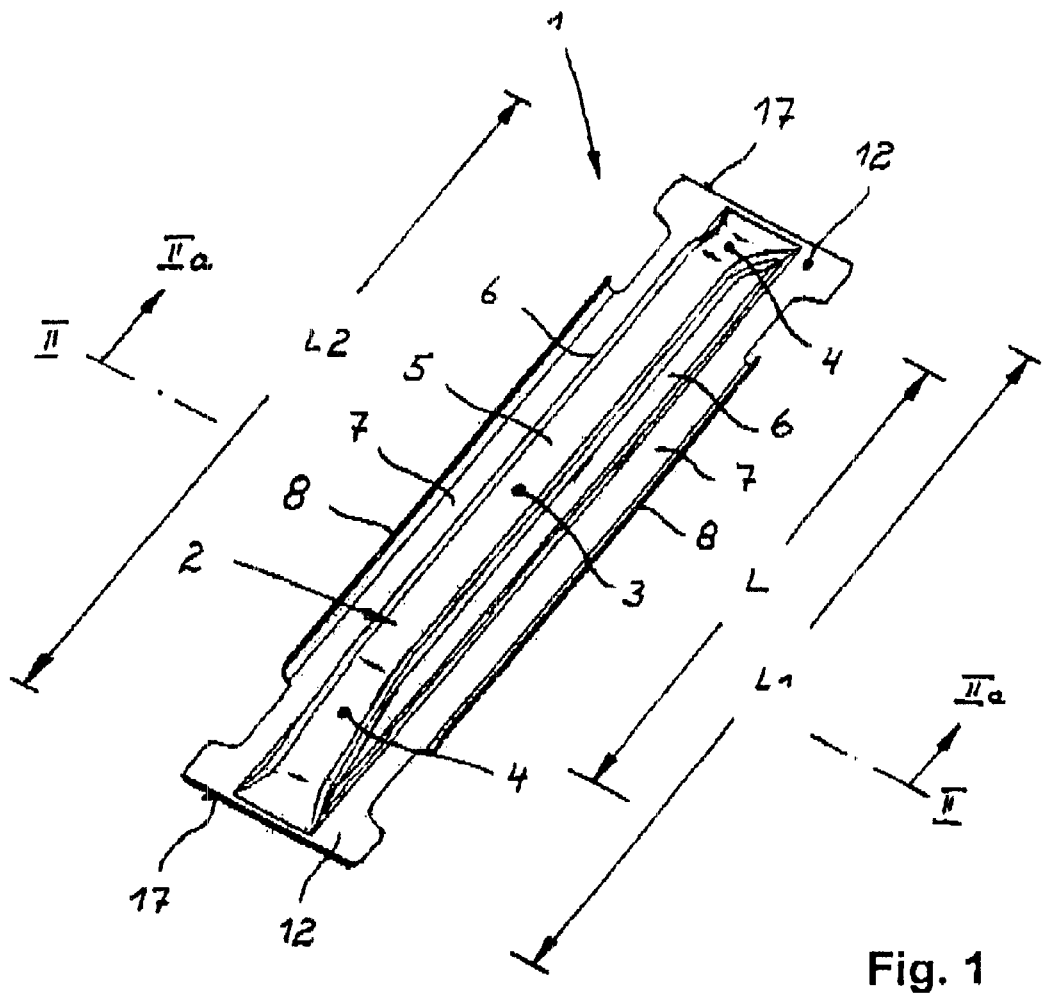
FIG. 1 is a perspective view of a first embodiment of a side impact beam according to the present invention.

Throughout all the Figures, same or corresponding elements are generally indicated by same reference numerals.

Turning now to the drawing, and in particular to FIG. 1, there is shown a perspective view of a first embodiment of a side impact beam according to the present invention, generally designated by reference numeral 1, for integration in a sidewall, especially a door, of a motor vehicle. The side impact beam 1 is defined by an overall length L1 and includes over a major portion of its length L1 an elongated bar of trapezoidal cross section, generally designated by reference numeral 2. The elongated bar 2 is defined by a length L2 and has a central length portion 3 of a length L and two ramp-like end portions 4, wherein the length L of the central length portion 3 is greater than half the length L1 of the side impact beam 1.

Figure 2:
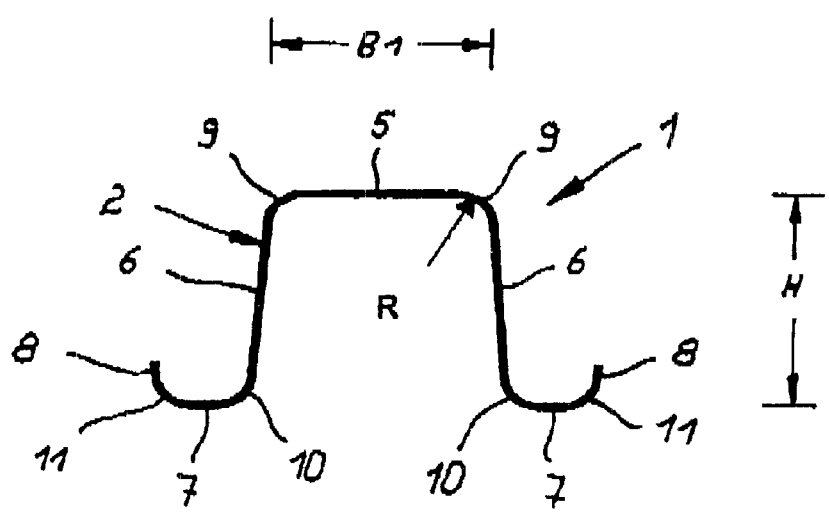
FIG. 2 is a vertical cross section, on an enlarged scale, of the side impact beam, taken along the line II—II in FIG. 1 in the direction of arrow IIa.

As shown in FIG. 2, which is a vertical cross section, on an enlarged scale, of the side impact beam 1, taken along the line II—II in FIG. 1 in the direction of arrow IIa, the elongated bar 2 is comprised of a central web 5, which extends over the entire length L2 of the elongated bar 2 and has a same width B1 throughout, and two flanks 6 which diverged laterally outwardly from the central web 5. The outer extremities of the flanks 6 terminate in flanges 7 which project transversely outwardly and end, in turn, in lateral webs 8. The transition 9 between the central web 5 and the flanks 6, the transition 10 between the flanks 6 and the flanges 7, and the transition 11 between the flanges 7 and the side webs 8 have a rounded configuration. The transition 9 from the central web 5 to the flanks 6 has a radius R of 10 mm. At a maximum, the radius R may be 20 mm.

The ends of the side impact beam 1 have a tongue-shaped configuration to provide attachment zones 12 for local securement in a sidewall, in particular a door, of a motor vehicle. The central web 5 terminates on opposite ends in proximity of the end faces 17 of the side impact beam 1 and taper off into the surfaces of the adjacent attachment zones 12.

Figure 3:
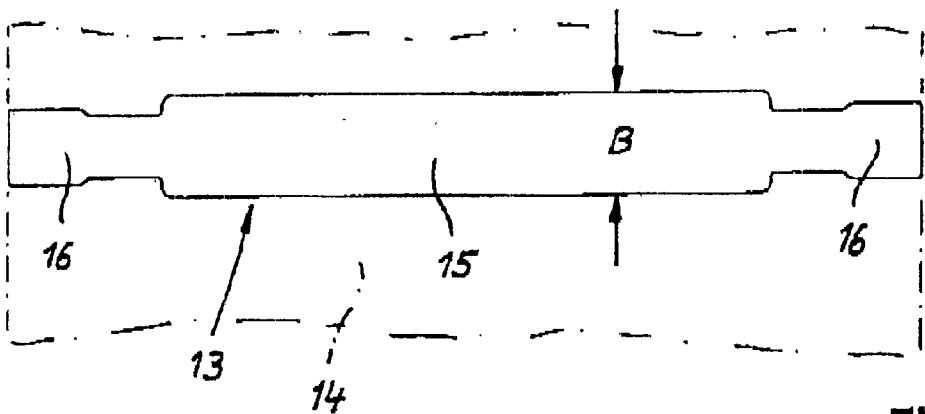
FIG. 3 is a top plan view of a semi-finished flat blank for manufacture of a side impact beam according to the present invention.

Manufacture of the side impact beam 1 is based on the use of a flat blank 13 of sheet metal, as shown in FIG. 3. The flat blank 13 is made from a sheet metal material band 14, which is drawn from a coil and has a constant sheet thickness, by cutting, e.g., stamping, the material band 14 to size. Hereby, it is relevant to note that the material band 14 has a constant width. The flat blank 14 has an elongated midsection 15 of constant width B and terminal end portions 16 of tongue-shaped configuration. Through shaping the flat blank 13, the side impact beam 1 can be made in a way that the central web 5 of the entire central length portion 3 has a constant width B1 and the flanks 6 have a same height H, as shown in FIG. 2.

Figure 4:
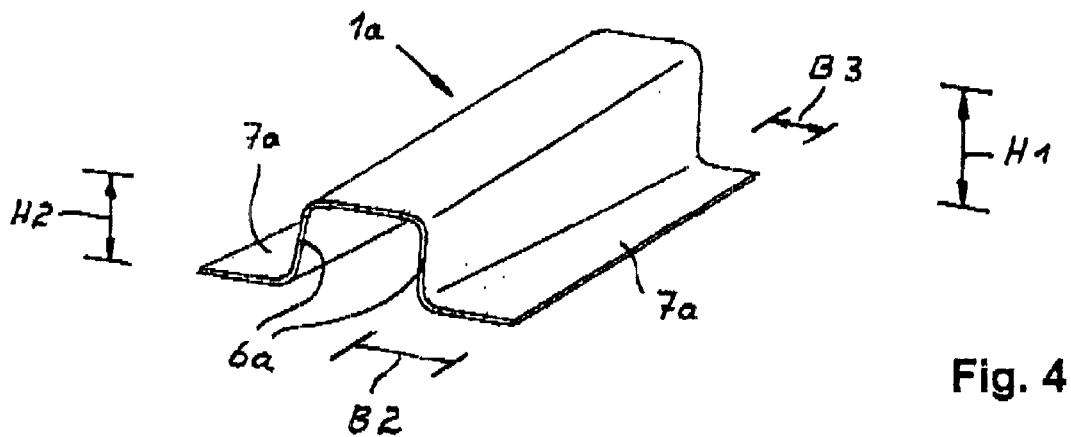
FIG. 4 is a perspective illustration of a length portion of a second embodiment of a side impact beam according to the present invention.

The configuration of the flat blank 13 has the advantage that a side impact beam may be produced in dependence on the available installation space and/or varying deformation demands, with flanks 6 of different vertical height. An example of such a side impact beam is shown in FIG. 4 and generally designated by reference numeral 1a. In describing FIG. 4, like parts of the side impact beam 1a corresponding with those of the side impact beam 1 in FIG. 1 will be identified by corresponding reference numerals, followed by the distinguishing character "a" in case corresponding but modified elements are involved. The side impact beam 1a can easily be produced on the basis of the flat blank 13 because it is only necessary to ensure that during the shaping process excess material migrates into the lateral flanks 6a to provide them with varying heights H1 and H2, so that the flanks 6a vary in height from H1 to H2 over the mid-section, while the flanges 7a also vary in width from B2 to B3.

Figure 5:
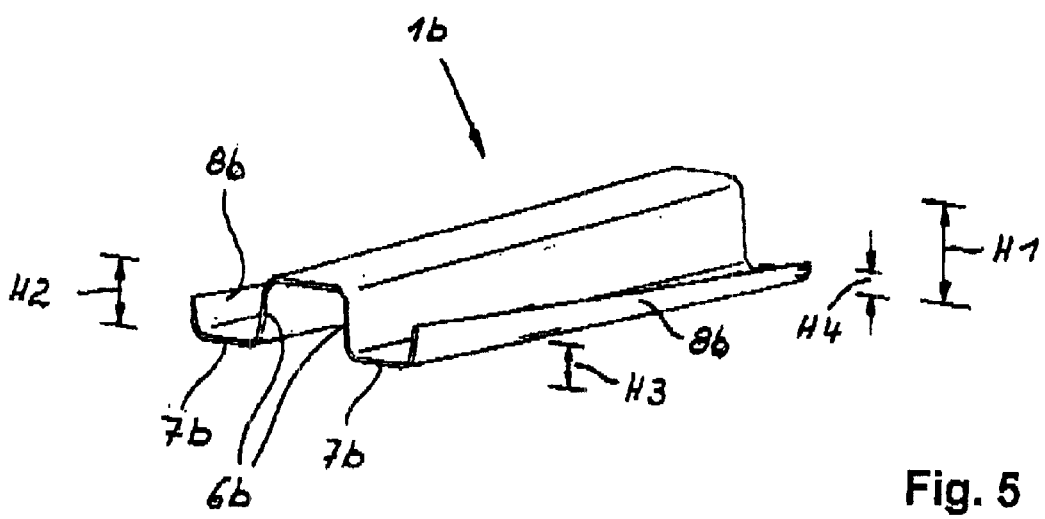
FIG. 5 is a perspective illustration of a length portion of a third embodiment of a side impact beam according to the present invention.

FIG. 5 is a perspective illustration of a length portion of a third embodiment of a side impact beam according to the present invention, generally designated by reference numeral 1b. In describing FIG. 5, like parts of the side impact beam 1b corresponding with those of the side impact beam 1 in FIG. 1 will be identified by corresponding reference numerals, followed by the distinguishing character "b" in case corresponding but modified elements are involved. When producing the side impact beam 1b from the flat blank 13, excess material migrates during the shaping process from the varying height H1, H2 of the flanks 6b into the side webs 8b, adjacent the flanges 7b, so that the side webs 8b vary in height from H3 to H4 over the midsection with varying flank height H1, H2.

While the invention has been illustrated and described as embodied in a semi-finished flat blank for a side impact beam, and side impact beam for a motor vehicle, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A side impact beam for integration in a sidewall of a motor vehicle, comprising an elongated bar defined by a length and having a generally trapezoidal cross section, wherein the bar includes a central length portion, which extends at least over half the length of the bar and terminates on opposite ends in ramp-like end portions which taper off in terminal attachment zones for local securement, wherein the attachment zones exhibit a tongue-shaped configuration in axial alignment to the central length portion and having end faces, wherein the bar is comprised of a central web, which terminates in the attachment zones in immediate proximity to the end faces of the attachment zones, and two flanks diverging laterally outwardly from the central web and having extremities for connection to flanges which project outwardly in transverse direction and end in lateral webs, wherein a transition from the central web to the flanks is rounded and has at least in midsection of the central length portion a radius, which is greater than 10 mm, wherein a transition from the flanks to the flanges is rounded, and wherein a transition from the flanges to the lateral wall is rounded.

2. A semi-finished flat blank for a side impact beam of claim 1 wherein the blank is cut to size from a material band of constant thickness and includes an elongated center portion of constant width and a length which is sized at least half a length of the blank, wherein the center portion terminates on opposite ends in tongue-shaped end portions.

3. The side impact beam of claim 1, wherein the radius is at a maximum 20 mm.

* * * * *